United States Patent
Jo et al.

(10) Patent No.: US 11,836,379 B1
(45) Date of Patent: Dec. 5, 2023

(54) HARD DISK ACCESS USING MULTIPLE ACTUATORS

(71) Applicant: Amazon Technologies, Inc., Seattle, WA (US)

(72) Inventors: Keun Soo Jo, Bellevue, WA (US); Munif M. Farhan, Bellevue, WA (US); Andrew Kent Warfield, Vancouver (CA); Seth W. Markle, Seattle, WA (US); Roey Rivnay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 80 days.

(21) Appl. No.: 16/588,308

(22) Filed: Sep. 30, 2019

(51) Int. Cl.

| | |
|---|---|
| *G06F 3/06* | (2006.01) |
| *G06F 12/109* | (2016.01) |
| *G06F 13/16* | (2006.01) |
| *G11B 5/55* | (2006.01) |
| *G11B 5/48* | (2006.01) |
| *G06F 13/42* | (2006.01) |

(52) U.S. Cl.
CPC .......... *G06F 3/0659* (2013.01); *G06F 3/0611* (2013.01); *G06F 3/0676* (2013.01); *G06F 12/109* (2013.01); *G06F 13/1668* (2013.01); *G06F 13/4282* (2013.01); *G11B 5/4886* (2013.01); *G11B 5/5526* (2013.01); *G06F 2212/1024* (2013.01); *G06F 2212/657* (2013.01); *G06F 2213/0032* (2013.01)

(58) Field of Classification Search
None
See application file for complete search history.

(56) References Cited

U.S. PATENT DOCUMENTS

| | | | | |
|---|---|---|---|---|
| 5,343,347 | A * | 8/1994 | Gilovich | G11B 5/4813 360/246.7 |
| 6,658,201 | B1 * | 12/2003 | Rebalski | G11B 5/012 369/124.09 |
| 7,102,842 | B1 * | 9/2006 | Howard | G11B 5/5521 360/61 |
| 7,385,781 | B1 * | 6/2008 | Craig | G06F 3/0676 360/77.01 |
| 7,760,463 | B2 * | 7/2010 | Ward | G11B 21/025 360/78.12 |
| 10,629,238 | B1 * | 4/2020 | Buch | G11B 21/02 |
| 2001/0047448 | A1 | 11/2001 | Sueoka et al. | |
| 2002/0062454 | A1 | 5/2002 | Fung | |

(Continued)

*Primary Examiner* — Michael Alsip
(74) *Attorney, Agent, or Firm* — Klarquist Sparkman, LLP

(57) ABSTRACT

Technologies are provided for supporting multi-actuator storage device access using logical addresses. Separate sets of storage locations on a storage medium of a storage device can be associated with different actuators of the storage device. For example, a first set of storage locations can be assigned to a first actuator of the storage device and a second set of storage locations can be assigned to a second actuator of the storage device. The storage locations of the storage medium can be associated with logical addresses. The storage device can receive a data access request containing a logical address and can identify a storage location associated with the logical address. The storage device can identify a storage location set to which the storage location belongs and can use an actuator associated with the storage location set to access the storage location associated with the logical address.

14 Claims, 8 Drawing Sheets

(56) References Cited

U.S. PATENT DOCUMENTS

2005/0235072 A1   10/2005  Smith et al.
2006/0044663 A1    3/2006  Stiles et al.
2007/0197100 A1*  8/2007  Tsao .................... G06F 13/4027
                                                                 439/638
2018/0174613 A1*  6/2018  Zhu ...................... G11B 5/5578

* cited by examiner

HARD DISK ACCESS USING MULTIPLE ACTUATORS

BACKGROUND

The storage device industry has started manufacturing storage devices that comprise storage media that can be accessed independently using different actuators. Such storage devices include hard drives with multiple actuators associated with different storage media. At least some hard drives with multiple actuators can use the actuators to independently access one or more platters of the hard drive. Current communication protocols that enable a computer to interface with a multi-actuator hard drive include Serial Attached SCSI (SAS), with which separate actuators of the hard drive can be associated with different logical unit numbers (LUNs).

DETAILED DESCRIPTION

Some newer communication protocols, such as SAS, support multi-actuator storage devices by enabling actuators of a storage device to be associated with separate LUNs, effectively treating each actuator, and any associated storage media, as if it is a separate storage device. However, support for this approach is limited to environments that have the infrastructure to support these newer protocols. For environments that currently interface with hard drives using older protocols (such as SATA), upgrading infrastructure to support newer protocols, such as SAS, can take significant time and engineering resources. Additionally, at least some storage devices that enable access to separate actuators require multiple ports for interfacing with the actuators: one port for each LUN that is associated with a different actuator.

At least some of the technologies described herein solve these problems by associating actuators of a multi-actuator storage device with different logical addresses (such as logical block addresses). By associating different actuators with different sets of logical addresses, a data access command can target a particular actuator by including a logical address in a set of logical addresses that is associated with the actuator. Such commands can be sent to the multi-actuator storage device via a single port, such as a SATA interface. Furthermore, such data access commands can be supported by other protocols, such as SAS. Thus, infrastructure in an environment can gradually be upgraded to change communication protocols without requiring a change to the technique for targeting the actuators of the storage devices in the environment.

For example, a first set of logical addresses can be associated with a first actuator of a storage device and a second set of logical addresses can be associated with a second actuator of the storage device. The first set of logical addresses can be assigned to storage locations on one or more storage media that is/are accessible using the first actuator and the second set of logical addresses can be assigned to storage locations on one or more storage media that is/are accessible using the second actuator.

The storage device can receive a data access request containing a logical address and can identify a logical address set to which the logical address belongs. The storage device can use the actuator associated with the logical address set to access the storage location assigned to the logical address. A computing device connected to the storage device can direct data access commands to particular actuators by sending commands that include logical addresses associated with the actuators.

Figure 1:
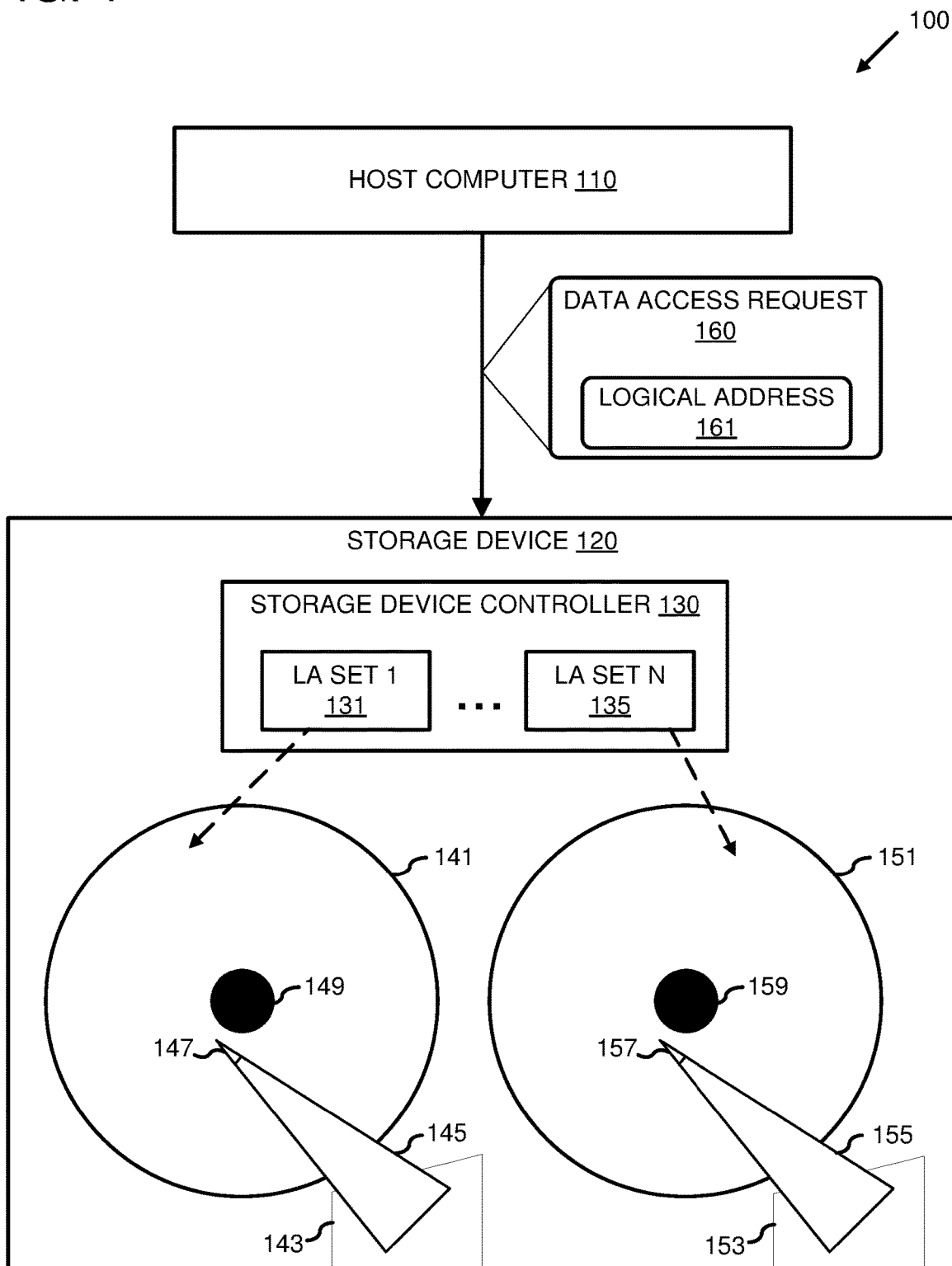
FIG. 1 is a system diagram depicting an example system for accessing separate storage media of a multi-actuator storage device using logical addresses.

FIG. 1 is a system diagram depicting an example system 100 for accessing separate storage media (e.g., 141 and 151) of a multi-actuator storage device 120 using logical addresses. The example system 100 comprises the storage device 120 and a host computer 110 that is connected to the storage device 120.

The storage device 120 comprises a storage device controller 130, the plurality of storage media (e.g., 141 and 151), and a plurality of actuators (e.g., 143 and 153) configured to access the plurality of storage media. The storage media 141 and 151 can comprise magnetic disks. For example, the storage medium 141 is depicted in FIG. 1 as a magnetic disk that is configured to rotate on a spindle 149 and the storage medium 151 is depicted in FIG. 1 as a magnetic disk that is configured to rotate on a spindle 159. Although the storage media 141 and 151 are depicted in FIG. 1 as being positioned side-by-side, this is for illustration purposes. Other configurations are possible. For example, the storage media 141 and 151 can be arranged vertically. In such a configuration, the spindles 149 and 159 can be a same spindle.

The storage device 120 comprises a storage device controller 130. The storage device controller 130 can be configured to access the storage media 141 and 151. Example data access can include reading data from a storage medium and/or writing data to a storage medium. For example, the storage device controller 130 can be configured to rotate the storage medium 141 on the spindle 149 and to perform data read and/or write operations on the storage medium 141 via a moveable actuator arm 145. The actuator arm 145 can comprise a read/write head 147. The actuator arm 145 can be rotated on an actuator axis (not shown) by an actuator 143 to move the read/write head 147 over different portions of the storage medium 141. The storage device controller 130 can be configured to write data to and/or to read data from the storage medium 141 using the read/write head 147. The read/write head 147 can comprise a single head that can perform both read and write operations. Alternatively, the read/write head 147 can comprise two separate heads for reading and writing, respectively. The storage device controller 130 can be configured to use the read/write head 147 to write data to the storage medium 141 in multiple concentric circular tracks as the storage medium is rotated on the spindle 149.

Additionally, the storage device controller 130 can be configured to rotate the storage medium 151 on the spindle 159 and to perform data read and/or write operations on the storage medium 151 via a moveable actuator arm 155. The actuator arm 155 can comprise a read/write head 157. The actuator arm 155 can be rotated on an actuator axis (not shown) by an actuator 153 to move the read/write head 157 over different portions of the storage medium 151. The storage device controller 130 can be configured to write data to and/or to read data from the storage medium 151 using the read/write head 157. The read/write head 157 can comprise a single head that can perform both read and write operations. Alternatively, the read/write head 157 can comprise two separate heads for reading and writing, respectively. The storage device controller 130 can be configured to use the read/write head 157 to write data to the storage medium 151 in multiple concentric circular tracks as the storage medium is rotated on the spindle 149.

Although two storage media (141 and 151) are depicted in FIG. 1, other numbers of storage media are possible. For example, a plurality of storage media can be accessed by a plurality of actuator arms connected to the actuator 143 and/or a plurality of storage media can be accessed by a plurality of actuator arms connected to the actuator 153. Additionally or alternatively, the storage device 120 can comprise one or more storage media that can be accessed by one or more additional actuators (not shown).

The storage device controller 130 can be configured to associate a set of logical addresses 131 with the actuator 143 and to associate a second set of logical addresses 135 with the actuator 153. Although two logical address sets (131 and 135) are depicted, more are possible. For example, the storage device controller 130 can be configured to associate a plurality of logical address sets with the actuator 143 and/or to associate a plurality of logical address sets with the actuator 153.

A logical address is an address associated with one or more data items stored on a storage medium (e.g., 141 or 151) of the storage device 120. The logical address can be associated with a physical storage location on the storage medium where the one or more data items is/are stored. However, the logical address is decoupled from the physical storage location so that the physical storage location of the one or more data items can change without changing the logical address. Example logical addresses include logical block addresses (LBAs). A logical address set (e.g., 131, 135) comprises a plurality of logical addresses. Example types of logical address sets include ranges of sequential and/or nonsequential logical addresses and patterns of interleaving logical addresses.

The storage device controller 130 is configured to receive a data access requests 160 from the host computer 110, wherein the data access request comprises a logical address 161. The data access requests 160 can comprise a request to access data at a storage location associated with the logical address 161. For example, the data access requests 160 can be a request to retrieve data from a storage location associated with the logical address 161 or a request to store data at the storage location associated with the logical address 161.

The storage device controller 130 is configured to determine a logical address set, of the plurality of logical address sets 131-135 to which the logical address 161 belongs and to identify an actuator, of the plurality of actuators 143-153, that is associated with the identified logical address set. The storage device controller 130 is configured to use the identified actuator to access a storage location associated with the logical address 161 on a storage medium of the storage device 120 that is accessible by the identified actuator. For example, the storage device controller 130 can determine that the logical address 161 is in the logical address set 131 that is associated with the actuator 143. The storage device controller 130 can then use the actuator 143 to access a storage location on the storage medium 141 that is associated with the logical address 161.

Since the logical address sets 131 and 135 are associated with separate actuators that are configured to access separate storage media of the storage device 120, in at least some embodiments the sets of logical addresses can be used to access the actuators 143 and 153, and their associated storage media 141 and 151, independently. For example, the host computer 110 can be configured to send separate data access requests targeting different storage media associated with the actuators 143-153 by including logical addresses in the separate data access requests that are in the logical address sets 131 and 135, respectively. By way of illustration, the logical address 161 can be a logical address in the logical address set 131. The storage device controller 130 can use the actuator 143, the actuator arm 145, and the read/write head 147 to access a storage location on the storage medium 141 associated with the logical address 161. Additionally, the storage device controller 130 can be configured to receive a second data access request (not shown) from the host computer 110, wherein the second data access request comprises a second logical address. The storage device controller 130 can determine that the second logical address is in the logical address set 135 and can use the actuator 153 to access a storage location on the storage medium 151 that is associated with the second logical address.

In at least some embodiments, the host computer 110 is configured to specify the logical address sets 131-135 that are associated with the actuators 143-153. For example, the host computer 110 can transmit a command (not shown) to the storage device 120, specifying the logical address set 131. In at least some such embodiments, the command can identify the actuator (e.g., 143) with which the logical address set 131 should be associated. Additionally or alternatively, the storage device controller 130 can be configured to associate the specified logical address set 131 with one of the actuators (e.g., 143) and to assign the logical addresses in the logical address set 131 to storage locations on one or more storage media that is/are accessible by the associated actuator (e.g., 141). The command can specify multiple logical address sets (e.g., 131-135). Additionally or alternatively, multiple commands, specifying different logical address sets, can be transmitted to the storage device 120.

In at least some embodiments, the storage device controller 130 can be configured to allocate separate resources for processing data access requests (e.g., 160) based on the logical address sets. For example, the storage device controller 130 can be configured to maintain separate buffers for requests targeting storage locations accessible by the different actuators 143 and 153. For example, the storage device controller 130 can maintain a first buffer for requests comprising logical addresses in the logical address set 131 and a second buffer for requests comprising logical addresses in the logical address set 135.

Thus, in at least some embodiments, separate logical address sets can be used to treat the multiple actuators of the storage device 120, and their respective storage media, like separate logical storage devices, regardless of a number of interfaces of the storage device 120. For example, requests targeting the separate actuators can be received via a same interface, such as a SATA interface.

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include flash storage devices (such as NAND-type flash devices and NOR-type flash devices), and random access data storage devices (such as DRAM devices). Further examples of storage devices include non-volatile dual in-line memory modules (NVDIMMs).

In some embodiments, the storage device comprises multiple disparate storage media. For example, the storage device can be a hard disk drive that comprises one or more magnetic disks and an internal memory. In another example, the storage device comprises solid state storage and magnetic storage. In another example the storage device comprises multiple magnetic disks organized as a Redundant Array of Independent Disks (RAID). Other combinations of disparate storage media are also possible.

A multi-actuator storage device is a storage device comprising multiple actuators that can be used to access storage media of the storage device. An actuator comprises one or more hardware components configured for use in accessing storage locations (such as zones, sectors, etc.) on one or more physical storage media of the storage device. For example, a hard drive comprising a magnetic disk can comprise an actuator that moves an actuator arm to various positions over a surface of the magnetic disk. In at least some multi-actuator storage devices, actuators of the storage device can be configured to access separate storage media of the storage device.

In any of the examples described herein, a storage device controller can comprise one or more hardware components of a storage device. The storage device controller can be configured to access a firmware stored in a read-only memory (ROM) of the device, a storage medium of the device, or some combination thereof. Additionally or alternatively, the storage device controller can be implemented at an intermediate layer between an application and the device. Such an intermediate layer controller can comprise software (such as a driver) and one or more processors, a system-on-chip (SoC), a field-programmable gate array (FPGA), and/or an application-specific integrated circuit (ASIC). In some embodiments, the storage device controller can be part of an application. In such an embodiment, the application may use the storage device controller to access a storage device directly, without using an intermediate layer, such as a driver. The storage device controller can be located on a computer containing the device, or on a separate computer that is connected to the device via a communication channel, such as a computer network.

In any of the examples described herein, a logical address comprises an identifier associated with one or more data items, such as a data block (or block of data). A data block can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical storage locations of data blocks in the storage device can change without having to notify or update any external components.

In any of the examples described herein, a host computer can be a server or other computing device that comprises a processor and is connected to a storage device. The host computer is connected to the device and configured to transmit commands, such as processing commands, communication commands, data access commands (i.e., commands to perform data read and write operations), inquiry commands, firmware update commands, or the like, to the device. The host computer can be configured to receive command responses from the device. The connection can be a direct connection, such as a cable or bus connection, an indirect connection, such as a connection over a network, or some combination thereof. In scenarios where the host computer is connected to more than one device, the various connections can be of the same type or different types.

In some embodiments, the host computer can comprise a controller connected to multiple devices. In at least some embodiments, the host computer can be a computing device configured to provide a unified access point for multiple connected storage devices, such as a JBOD ("just a bunch of drives/disks") device, a RAID array controller, etc.

In any of the examples described herein, a firmware can comprise one or more software components that provide control and/or monitoring of one or more components of an electronic device. In at least some embodiments, the firmware comprises executable instructions stored in a non-volatile storage location (such as a non-volatile random access memory (NVRAM), an electronically erasable programmable read-only memory (EEPROM), a persistent storage medium, or the like). The firmware can be accessed by a device controller (such as a storage device controller) during a boot process of the device. Additionally or alternatively, the firmware can be accessed in response to one or more commands transmitted to the device from a connected computing device (such as a host computer).

Figure 2:
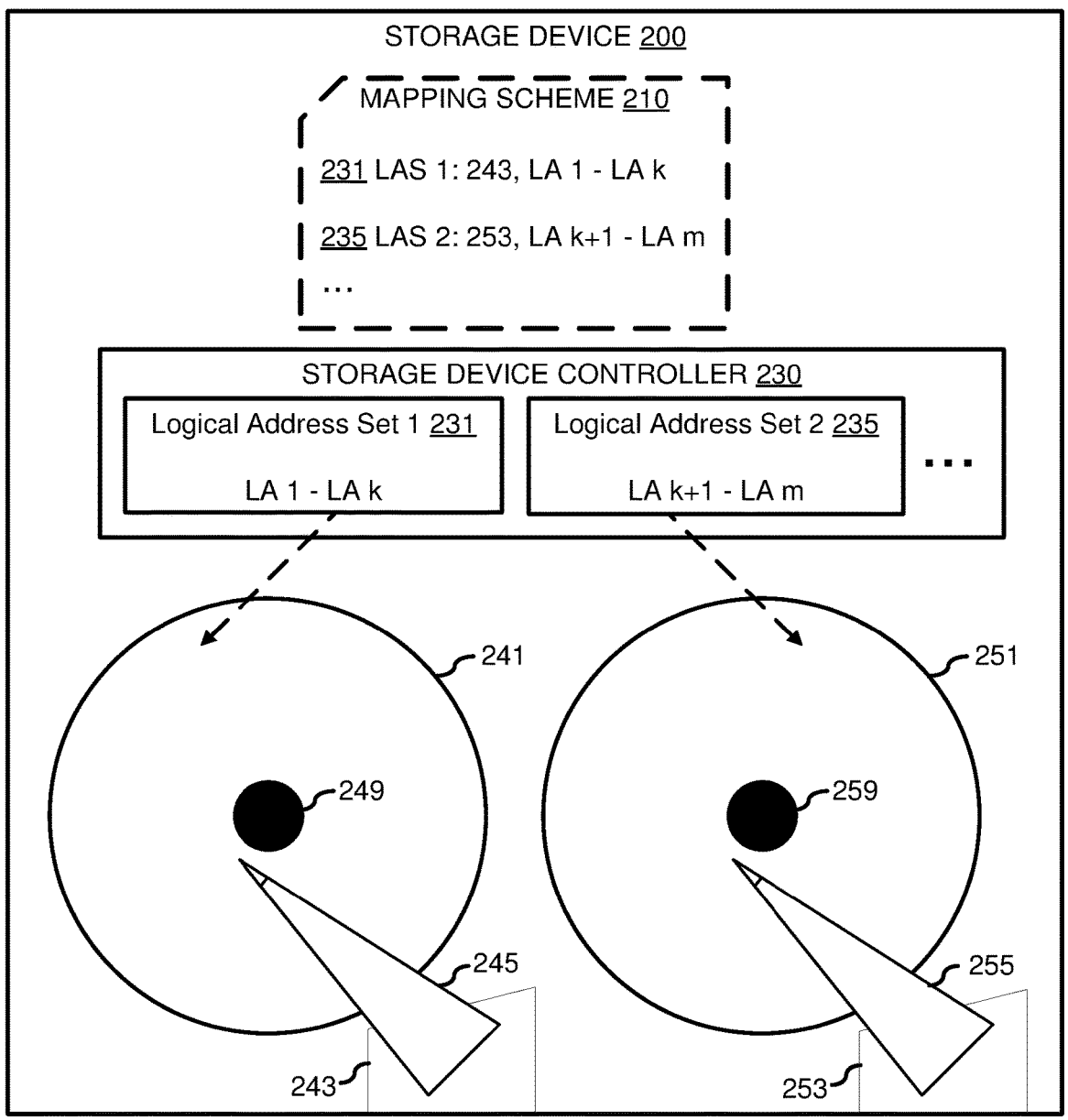
FIG. 2 is a diagram depicting an example storage device configured to associate separate sequences of logical addresses with different storage device actuators.

FIG. 2 is a diagram depicting an example storage device 200 configured to associate separate sequential ranges of logical addresses (231, 235, etc.) with different storage device actuators (e.g., 243 and 253). The storage device 200 comprises a plurality of storage media 241 and 251. Although two storage media are depicted, other numbers of storage media are possible.

The storage device 200 comprises a storage device controller 230. The storage device controller 230 can be configured to access the storage media 241 and 251. Example data access can include reading data from a storage medium and/or writing data to a storage medium. For example, the storage device controller 230 can be configured to rotate the storage medium 241 on a spindle 249 and to perform data read and/or write operations on the storage medium 241 via a moveable actuator arm 245. The actuator arm 245 can be rotated on an actuator axis (not shown) by the actuator 243 over different portions of the storage medium 241. The storage device controller 200 can be configured to write data to and/or to read data from the storage medium 241.

Additionally or alternatively, the storage device controller 230 can be configured to rotate the storage medium 251 on a spindle 259 and to perform data read and/or write operations on the storage medium 251 via a moveable actuator arm 255. The actuator arm 255 can be rotated on an actuator axis (not shown) by an actuator 253 over different portions of the storage medium 251. The storage device controller 230 can be configured to write data to and/or to read data from the storage medium 251. Although the storage media 241 and 251 are depicted side-by-side, this is for illustration purposes. Other arrangements are possible. For example, the storage media 241 and 251 can be stacked vertically. In such an embodiment, the actuators 243 and 253 can be stacked vertically as well and the spindles 249 and 259 can be a same spindle.

The storage device controller 230 comprises a plurality of logical address sets (e.g., 231, 235, . . . ) that comprise sequential ranges of logical addresses. For example, the logical address set 231 comprises a range of logical addresses (LA 1-LA k) and the logical address set 235 comprises a subsequent range of logical addresses (LA k+1-LA m), where 1<k<m.

The storage device controller 230 is configured to associate the sequential range of logical addresses in the logical address set 231 with a plurality of storage locations on one or more storage media that is/are accessible by the actuator 243 (e.g., 241). The storage device controller 230 is configured to associate the sequential range of logical addresses in the logical address set 235 with another plurality of storage locations on one or more other storage media accessible by the actuator 253 (e.g., 251). The storage locations associated with a sequential range of logical addresses can comprise one or more contiguous and/or non-contiguous ranges of storage locations on one or more storage media. The storage device controller 230 can be configured to receive data access requests comprising logical identifiers. For a given data access request, the storage device controller 230 can identify the logical address set whose sequential range of logical addresses contains the given data access request's logical address. The storage device controller 230 can then use the actuator (e.g. 243 were 253) associated with the identified logical address set to access a storage location on a storage medium (e.g., 241 or 251) that is associated with the logical identifier.

Optionally, the storage device 200 can comprise a mapping scheme 210 that defines the plurality of logical address sets (231, 235, etc.). For example, the mapping scheme 210 is depicted in FIG. 2 as containing entries that define the logical address sets 231 and 235. The entry for the logical address set 231 specifies the range of logical addresses for the logical address set 231 and identifies the actuator 243 associated with the logical address set 231. The entry for the logical address set 235 specifies the range of logical addresses for the logical address set 235 and identifies the actuator 253 associated with the logical address set 235. In at least some embodiments, the mapping scheme 210 can be stored in a firmware (not shown) of the storage device 200. In such an embodiment, during an initialization of the storage device 200, the storage device controller 230 can analyze the mapping scheme 210 and use it to create the logical address sets 231, 235, etc., associate them with the identified actuators, and assign storage locations to the logical addresses on storage media accessible by the respective actuators. Additionally or alternatively, the mapping scheme 210 can be specified by a host computer (not shown) connected to the storage device 200.

Figure 3:
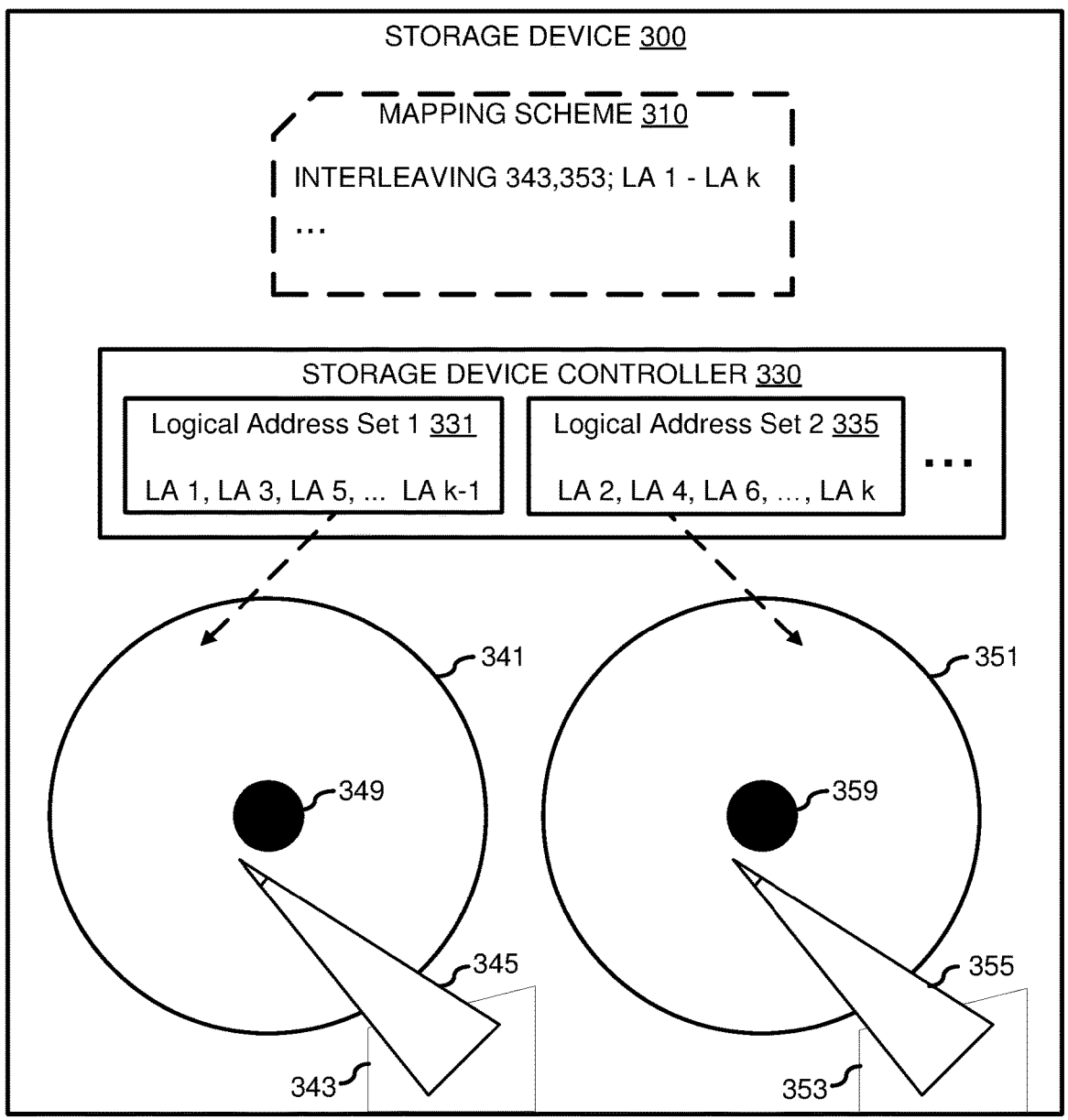
FIG. 3 is a diagram depicting an example storage device configured to associate different storage device actuators with interleaved sets of logical addresses.

FIG. 3 is a diagram depicting an example storage device 300 configured to associate different storage device actuators (e.g., 343 and 353) with interleaved sets of logical addresses (331, 335, etc.). The storage device 300 comprises a plurality of storage media 341 and 351. Although two storage media are depicted, other numbers of storage media are possible.

The storage device 300 comprises a storage device controller 330. The storage device controller 330 can be configured to access the storage media 341 and 351. Example data access can include reading data from a storage medium and/or writing data to a storage medium. For example, the storage device controller 330 can be configured to rotate the storage medium 341 on a spindle 349 and to perform data read and/or write operations on the storage medium 341 via a moveable actuator arm 345. The actuator arm 345 can be rotated on an actuator axis (not shown) by an actuator 343 over different portions of the storage medium 341. The storage device controller 300 can be configured to write data to and/or to read data from the storage medium 341.

Additionally or alternatively, the storage device controller 330 can be configured to rotate the storage medium 351 on a spindle 359 and to perform data read and/or write operations on the storage medium 351 via a moveable actuator arm 355. The actuator arm 355 can be rotated on an actuator axis (not shown) by an actuator 353 over different portions of the storage medium 351. The storage device controller 330 can be configured to write data to and/or to read data from the storage medium 351. Although the storage media 341 and 351 are depicted side-by-side, this is for illustration purposes. Other arrangements are possible. For example, the storage media 341 and 351 can be stacked vertically. In such an embodiment, the actuators 343 and 353 can be stacked vertically as well and the spindles 349 and 359 can be a same spindle.

The storage device controller 330 comprises a plurality of logical address sets (e.g., 331, 335, etc.) that comprise interleaved sets of logical addresses. For example, the storage device controller 330 can be configured to create the logical address sets 331 and 335 by assigning odd-numbered logical addresses in a sequential range of logical addresses to the logical address set 331, and assigning even-numbered logical addresses in the sequential range of logical addresses to the logical address set 335.

The storage device controller 330 is configured to associate the set of logical addresses 331 with a plurality of storage locations on one or more storage media that are accessible by the actuator 343 (e.g., 341). The storage device controller 330 is configured to associate the set of logical addresses 335 with another plurality of storage locations on one or more other storage media accessible by the actuator 353 (e.g., 351). The storage locations associated with a logical address set can comprise one or more contiguous and/or non-contiguous ranges of storage locations on one or more storage media.

The storage device controller 330 can be configured to receive data access requests comprising logical identifiers. For a given data access request, the storage device controller 330 can identify the logical address set that contains the given data access request's logical address. For example, in the particular example depicted in FIG. 3, identifying the logical address set for a given logical address can comprise determining whether the given logical address is even or odd. The storage device controller 330 can then use the actuator (e.g. 343 were 353) associated with the identified logical address set to access a storage location on a storage medium (e.g., 341 or 351) that is associated with the logical identifier.

In this way, the logical addresses in the specified range of logical addresses can be distributed across storage media accessible by the separate actuators 343 and 353 in an alternating pattern. Thus, in at least some embodiments, data access operations targeting logical addresses in the specified range can be evenly distributed across the actuators 343 and 353. In at least some cases, this can enable RAID-like schemes, using the actuators, and associated storage media, like independent disks.

Optionally, the storage device 300 can comprise a mapping scheme 310 that defines the plurality of logical address sets (331, 335, etc.). For example, the mapping scheme 310 is depicted in FIG. 3 as containing an entry that specifies the range of logical addresses (LA 1-LA k) that should be interleaved across logical address sets associated with the actuators 343 and 353.

In at least some embodiments, the mapping scheme 310 can be stored in a firmware (not shown) of the storage device 300. In such an embodiment, during an initialization of the storage device 300, the storage device controller 330 can analyze the mapping scheme 310 and use it to create the logical address sets 331, 335, etc., associate them with the identified actuators, and assign storage locations to the logical addresses on storage media accessible by the respective actuators. Additionally or alternatively, the mapping scheme 210 can be specified by a host computer (not shown) connected to the storage device 200.

Although FIGS. 2 and 3 depict logical address sets containing sequential logical address ranges and interleaved address ranges, respectively, hybrid configurations are also possible. For example, a storage device controller can be configured to contain both logical address sets that comprise one or more sequential address ranges and logical address sets that comprise one or more interleaved address ranges. Additionally or alternatively, a given actuator can be associated with more than one logical address set. For example, one logical address set can be associated with storage locations in one or more storage media accessible by the actuator and another logical address set can be associations with other storage locations in a same or different one or more storage media accessible by the actuator.

Figure 4:
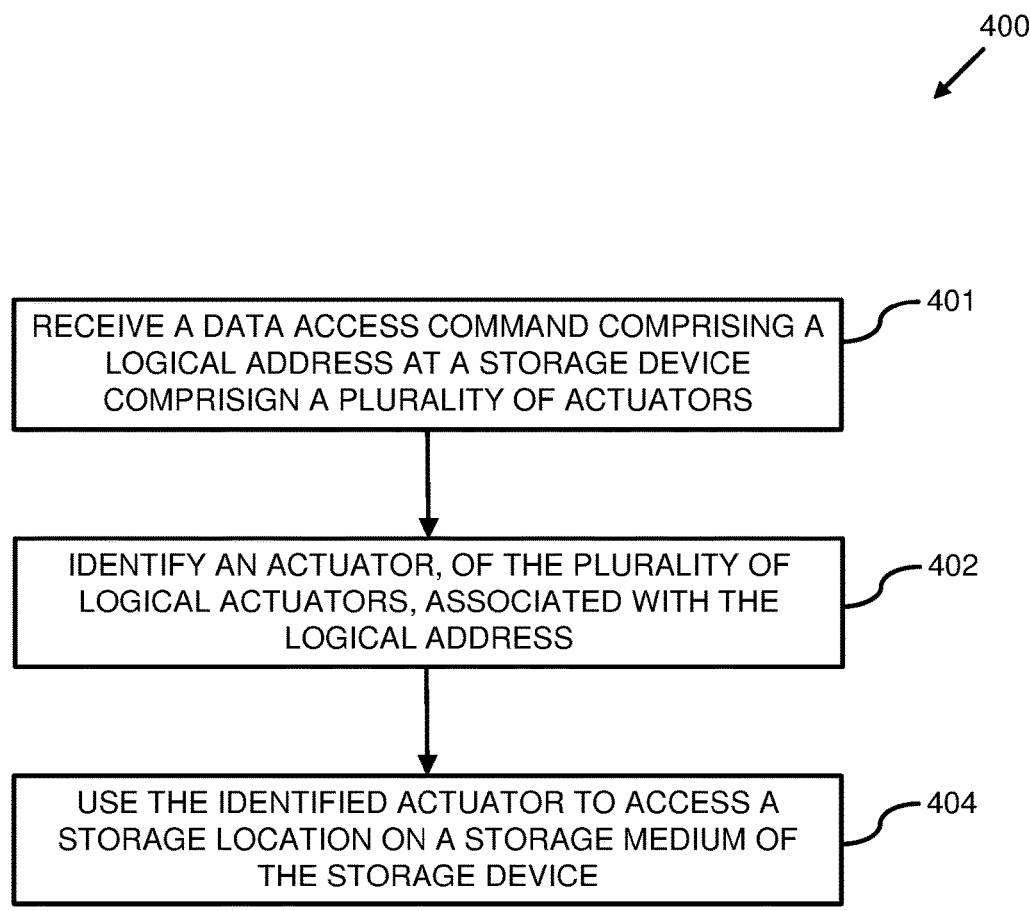
FIG. 4 is a flow chart of an example method for accessing storage media of a multi-actuator storage device using logical addresses.

FIG. 4 is a flow chart of an example method 400 for accessing storage media of a multi-actuator storage device using logical addresses. Any of the example systems or devices described herein can be used to perform the example method 400.

Figure 5:
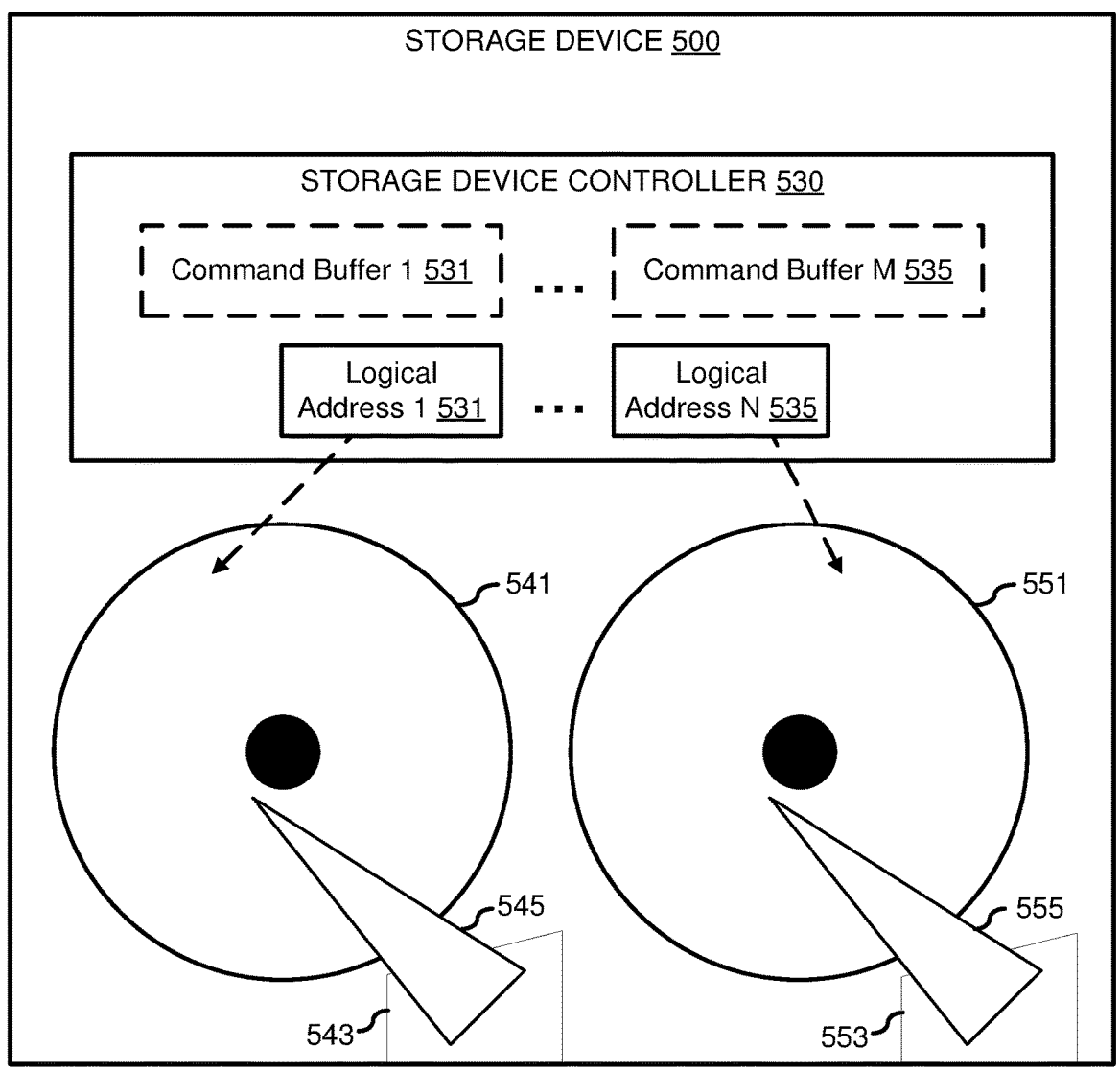
FIG. 5 is a diagram depicting an example multi-actuator storage device comprising a controller configured to access storage media of the storage device using logical addresses.

For example, the example storage device 500, depicted in FIG. 5, can be used to perform the example method 400. The storage device 500 comprises a plurality of storage media 541 and 551. The storage device 500 comprises an actuator 543 connected to an actuator arm 545 and configured to access the storage medium 541; and an actuator 553 connected to an actuator arm 555 and configured to access the storage medium 551.

Referring to FIG. 4, at 401, a data access command comprising a logical address is received at a storage device comprising a plurality of actuators and a plurality of storage media. The data access command can be received from a computing device connected to the storage device via a communication channel. The communication channel can comprise one or more wired and/or wireless connections. In a particular embodiment, the data access command can be received from a host computer connected to the storage device via a serial connection (such as a SATA, etc.). The logical address can comprise an identifier that is associated with a storage location in a storage medium of the storage device (such as a logical block address (LBA)). The data access command can comprise a command to read data associated with the logical address and/or write data associated with the logical address.

For example, the storage device 500 depicted in FIG. 5 can be used to receive the data access command. The storage device 500 comprises a storage device controller 530 that can be configured to receive the data access command via an interface of the storage device (not shown), such as a SATA interface.

Referring to FIG. 4, at 402, an actuator, of the plurality of actuators, that is associated with the logical address is identified. In at least some embodiments, the storage device can be configured to associate sets of logical addresses with the plurality of actuators of the storage device. For example, the storage device can associate a given set of logical addresses with storage locations on one or more storage media, of the plurality of storage media, that are accessible by an actuator of the plurality of actuators. Separate sets of logical addresses can be associated with different actuators, of the plurality of actuators. For example, a first set of logical addresses can be associated with a first actuator, of the plurality of actuators, and a second set of logical addresses can be associated with the second actuator, of the plurality of actuators.

Associating the sets of logical addresses with the plurality of actuators can comprise assigning ranges of logical addresses to storage locations that are accessible using the various actuators. For example, associating the first set of logical addresses with the first actuator can comprise assigning a first range of logical addresses to storage locations on a first storage medium, of the plurality of storage media, that is accessible by the first actuator. Associating the second set of logical addresses with the second actuator, of the plurality of actuators, can comprise assigning a second range of logical addresses to storage locations on a second storage medium, of the plurality of storage media, that is accessible by the second actuator. Example ranges of logical addresses include sequential ranges of logical addresses and nonsequential ranges of logical addresses.

Additionally or alternatively, associating sets of logical addresses with the plurality of actuators can comprise interleaving a range of logical addresses across storage media accessible by separate actuators. For example, associating the first set of logical addresses with the first actuator and associating the second set of logical addresses with the second actuator can comprise alternating between associating a logical address in a sequence of logical addresses with a storage location on a storage medium, of the plurality of storage media, that is accessible by the first actuator; and associating a subsequent logical address in the sequence of logical addresses with another storage location on another storage medium, of the plurality of storage media, that is accessible by the second actuator. This alternating assignment can continue until all logical addresses in the range of logical addresses have been assigned. An example result of such a process is a first set of logical addresses comprising odd-numbered logical addresses that are assigned to one or more storage media that is/are accessible by the first actuator; and a second set of logical addresses comprising even-numbered logical addresses that are assigned to one or more storage media that is/are accessible by the second actuator.

In at least some embodiments, a command can be received at the storage device, specifying one or more logical address sets. Responsive to receiving the command, the specified one or more logical address sets can be associated with one or more actuators, of the plurality of actuators. For example, a command can be received that specifies a first set of logical addresses. The set of logical addresses can be associated with a first actuator, of the plurality of actuators, subsequent to receiving the command. In at least some scenarios, one or more additional logical address sets can be specified in the command. The one or more additional logical address sets can be associated with one or more additional actuators of the storage device. Additionally or alternatively, multiple commands can be received, specifying different logical address sets.

Identifying the actuator associated with the logical address can comprise determining a logical address set to which the logical address belongs. Identifying the actuator can further comprise identifying an actuator, of the plurality of actuators, that is associated with the logical address set. Additionally or alternatively, identifying the actuator can comprise identifying a storage location associated with the logical address and identifying an actuator, of the plurality of actuators, with which the storage location can be accessed.

Referring to FIG. 5, the storage device controller 530 can be used to identify one of the actuators (e.g., 543 or 553) associated with the logical address. The storage device controller 530 can be configured to associate various logical addresses (e.g. 531-535) with a plurality of actuators of the storage device 500 (e.g. 543 and 553). Upon receipt of a data access command comprising a logical address, the storage device controller 530 can identify one of the actuators with which the logical addresses associated.

In at least some embodiments, the storage device controller 530 is configured to associate a first set of logical addresses with the actuator 543 and to associate a second set of logical addresses with the actuator 553. In such an embodiment, the storage device controller 530 can identify one of the logical address sets that contains the logical address received as part of the data access command. For example, the storage device controller 530 can determine that the logical address is in the first set of logical addresses. It is also possible for a given actuator to be associated with a plurality of logical address sets.

In at least some embodiments, one or more of the logical address sets can comprise a sequential range of logical addresses. For example, a first set of logical addresses can comprise a sequential range of logical addresses and a second set of logical addresses can comprise another sequential range of logical addresses. The sequential range of logical addresses in the first set can be associated with storage locations in one or more storage media that is/are accessible using the actuator 543 (e.g., 541); and the sequential range of logical addresses in the second set can be associated with storage locations in one or more other storage media that is/are accessible using the actuator 553 (e.g., 551).

Additionally or alternatively, the storage device controller 530 can be configured to associate a first set of logical addresses with the actuator 543 and to associate a second set of logical addresses with the actuator 553 using an interleaving pattern. An interleaving pattern can be used to interleave logical addresses in a logical address range among a plurality of logical address sets. For example, an interleaving pattern may stipulate that odd numbered logical addresses in a given logical address range should be assigned to a first logical address set, that even numbered logical addresses in the given logical address range should be assigned to a second logical address set, and that the first logical address set and the second logical address set should be associated with different actuators. It is possible for interleaving patterns to result in other numbers of logical address sets. For example, an interleaving pattern can specify that logical addresses in the range of logical addresses should be spread across three logical address sets, four logical address sets, etc.

In at least some embodiments, the storage device controller 530 is configured to use a logical address mapping scheme (not shown) to associate logical addresses 531-535 with the actuators 543-553. For example, the logical address mapping scheme can specify that the logical address 531 should be associated with a storage location on the storage medium 541 that is accessible by the actuator 543; and that the logical address 535 should be associated with a storage location on the storage medium 551 that is accessible by the actuator 553. In some embodiments, the mapping scheme defines sets of logical addresses that should be associated with the various actuators of the storage device 500. In such an embodiment, the storage device controller 530 can be configured to use the logical address mapping scheme to associate a first set of logical addresses with the actuator 543 and to associate the second set of logical addresses with the actuator 553.

The storage device controller 530 can be configured to receive a logical address mapping scheme from a computing device (not shown) that is connected to the storage device 500. For example, the storage device controller 530 can be configured to receive the logical address mapping scheme from a computing device during an initialization sequence of the storage device 500. The storage device controller 530 can be configured to store the logical address mapping scheme in a firmware (not shown) of the storage device 500. During an initialization of the storage device 500, the storage device controller 530 can be configured to analyze the logical address mapping scheme and to create associations between the plurality of logical addresses 531-535 and the plurality of actuators 543-553 based on the logical address mapping scheme. In at least some embodiments, the mapping scheme can be received via a same interface that data access commands are received from the computing device (or additional computing devices). Additionally or alternatively, the logical address mapping scheme can be received via a different interface.

Referring to FIG. 4, at 404, the identified actuator is used to access a storage location on a storage medium, of the plurality of storage media. Accessing the storage location can comprise reading one or more data items that are associated with the logical address from the storage location and/or writing one or more data items that are associated with the logical address to the storage location. The received data access command can indicate whether a write operation or a read operation is requested.

For example, the storage device controller 530 depicted in FIG. 5, can be used to access a storage location on one of the storage media (e.g., 541 or 551) using the identified actuator. In a particular example, the storage device controller 530 receives a data access request comprising the logical address 531. The storage device controller 530 determines that the logical address 531 is in a first set of logical addresses that is associated with the actuator 543. The storage device controller 530 then uses the actuator 543 and the actuator arm 545 to access a storage location on the storage medium 541 that is associated with the logical address 531.

The storage device controller 530 can be configured to receive multiple data access requests that are handled using separate actuators. For example, the storage device controller 530 can receive a second data access request comprising the logical address 535. The storage device controller 530 can determine that the logical address 535 is in another set of logical addresses that is associated with the actuator 553. The storage device controller 530 can then use the actuator 553 and the actuator arm 555 to access a storage location on the storage medium 551 that is associated with the logical address 535.

Optionally, the storage device controller 530 can be configured to maintain separate command buffers 531-535 associated with the plurality of actuators (543, 553, etc.) of the storage device 500. For example, the command buffer 531 can be used to process data access commands containing logical addresses that are associated with the actuator 543. The command buffer 535 can be used to process data access commands containing logical addresses that are associated with the actuator 553. (Although to actuators 543 and 553 are depicted in FIG. 5, other numbers of actuators and associated storage media are possible.)

Figure 6:
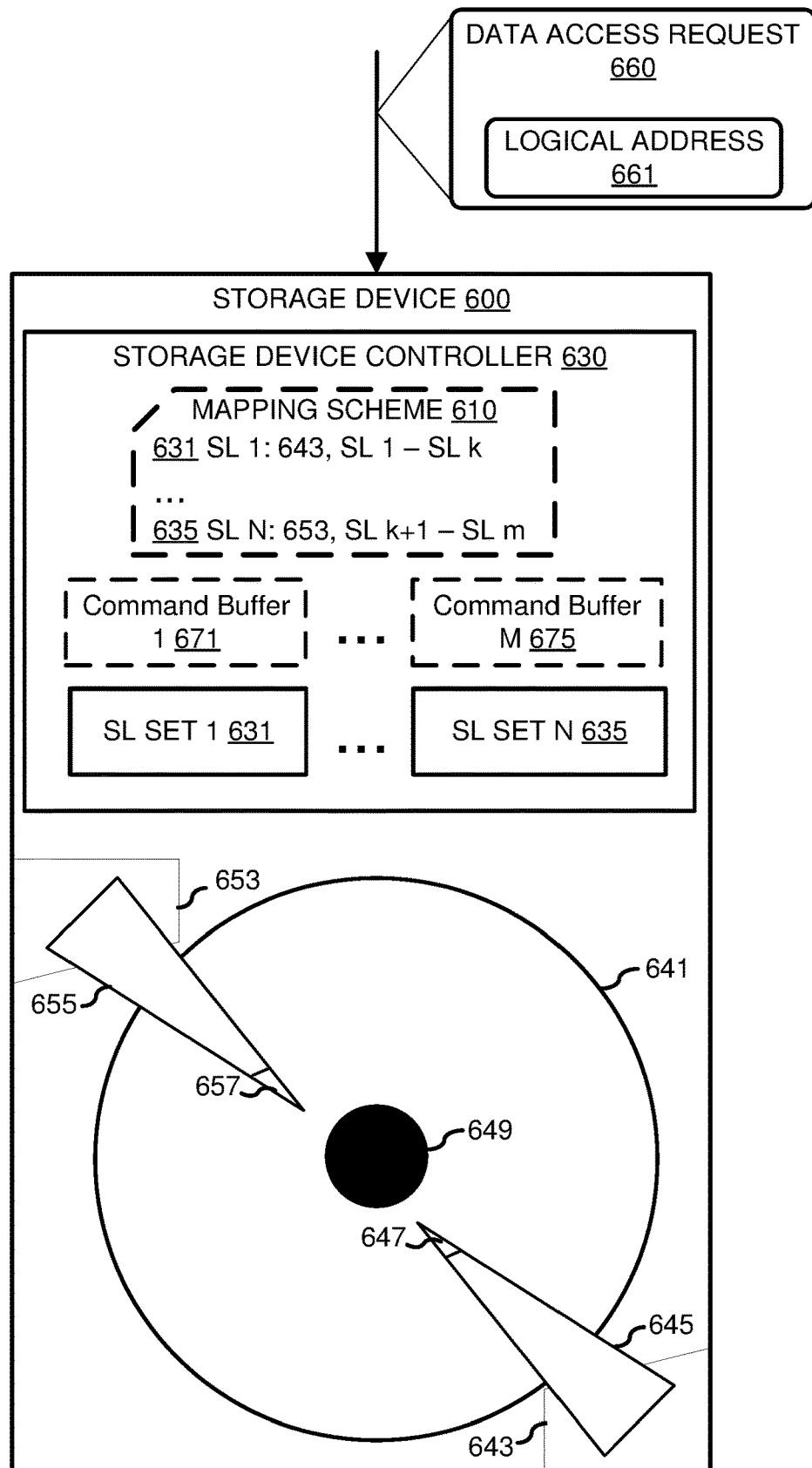
FIG. 6 is a diagram depicting an example multi-actuator storage device configured to use multiple actuators for accessing a storage medium of the storage device.

FIG. 6 is a diagram depicting an example multi-actuator storage device 600 configured to use multiple actuators (e.g., 643 and 653) to access a storage medium 641 of the storage device 600. The storage device 600 is configured to receive a data access request 660 that comprises a logical address 661. In at least some embodiments, the data access request 660 can be received from a computing device (not shown), such as a host computer, that is connected to the storage device via a communication channel.

The communication channel can comprise one or more wired and/or wireless connections. In a particular embodiment, the data access command can be received at serial interface (not shown) of the storage device 600 (such as a SATA interface, etc.). The logical address 661 can comprise an identifier (such as a logical block address (LBA), etc.) that is associated with a storage location on the storage medium 641. The data access command can comprise a command to read data associated with the logical address and/or write data associated with the logical address.

The storage device 600 comprises a storage device controller 630, a storage medium 641, and the plurality of actuators (e.g., 643 and 653) configured to access a storage medium 641. The storage medium 641 can comprise a magnetic disk. For example, the storage medium 641 is depicted in FIG. 6 as a magnetic disk that is configured to rotate on a spindle 649.

The storage device 600 comprises a storage device controller 630. The storage device controller 630 can be configured to access the storage medium 641. Example data access can include reading data from the storage medium 641 and/or writing data to the storage medium 641. For example, the storage device controller 630 can be configured to rotate the storage medium 641 on the spindle 649 and to perform data read and/or write operations on the storage medium 641 using one or both of the actuators 643 and 653. The actuator 643 comprises a movable actuator arm 645 that comprises a read/write head 647. The actuator arm 645 can be rotated on an actuator axis (not shown) by the actuator 643 to move the read/write head 647 over different portions of the storage medium 641. The storage device controller 630 can be configured to write data to and/or read data from the storage medium 641 using the read/write head 647. The read/write head 647 can comprise a single head that can perform both read and write operations. Alternatively, the read/write head 647 can comprise two separate heads for reading and writing, respectively. The storage device controller 630 can be configured to use the read/write head 647 to write data to the storage medium 641 in multiple concentric circular tracks as the storage medium is rotated on the spindle 649.

Additionally, the actuator 653 comprises a movable actuator arm 655 that comprises a read/write head 657. The actuator arm 655 can be rotated on an actuator axis (not shown) by the actuator 653 to move the read/write head 657 over different portions of the storage medium 641. The storage device controller 630 can be configured to write data to and/or read data from the storage medium 641 using the read/write head 657. The read/write head 657 can comprise a single head that can perform both read and write operations. Alternatively, the read/write head 657 can comprise two separate heads for reading and writing, respectively. The storage device controller 630 can be configured to use the read/write head 647 to write data to the storage medium 641 in multiple concentric circular tracks as the storage medium is rotated on the spindle 649. Although two actuators are depicted in FIG. 6, other numbers of actuators are possible. Additionally or alternatively, the storage device 600 can comprise more than one storage medium that can be accessed by the same actuators and/or additional actuators.

The storage device controller 630 can be configured to associate the actuator 643 with a first set of storage locations (e.g., 631) on the storage medium 641 and to associate the actuator 653 with a second set of storage locations (e.g., 635). Example storage locations include data blocks, data sectors, circular tracks, zones, etc. In at least some embodiments, a storage location can be associated with an identifier (such as a physical address, a sector identifier, a tract identifier, a zone identifier, or the like). Although two storage location address sets are depicted (631 and 635), other numbers of storage location sets are possible.

Upon receipt of the data access request 660, the storage device controller 630 can determine that the logical address 661 is associated with a storage location in one of the sets of storage locations and can use an actuator associated with the identified set of storage locations to access the storage location on the storage medium 641 that is associated with the logical address 661. For example, upon receipt of the data access request 660, the storage device controller 630 can determine that the logical address 661 is associated with a storage location in the set of storage locations 631. The storage device controller 630 can then use the actuator 643 to access the storage location associated with the logical identifier 661 on the storage medium 641.

The storage device controller can be configured to receive multiple data access requests. For example, the storage device controller 630 can receive another data access request (not shown) comprising another logical identifier. The storage device controller 630 can determine that the another logical identifier is associated with another storage location in the set of storage locations 635. The storage device controller 630 can then use the actuator 653 to access the another storage location associated with the another identifier on the storage medium 641.

Various strategies can be employed for assigning storage locations on the storage medium 641 to different actuators of the storage device 600. In at least some embodiments, the set of storage locations 631 can comprise a range of tracks on the storage medium 641 that are associated with the actuator 643, and the set of storage locations 635 can comprise another range of tracks on the storage medium 641 that are associated with the actuator 653. For example, the set of storage locations 631 can comprise a range of tracks closer to an outer diameter of the storage medium 641 than the set of storage locations 635. The set of storage locations 635 can comprise a range of tracks closer to an inner diameter of the storage medium 641 than the set of storage locations 631. Additionally or alternatively, alternating ranges of storage locations can be assigned to the respective actuators. For example, even-numbered tracks of the storage medium 641 can be assigned to the storage location set 631 and even-numbered tracks of the storage medium 641 can be assigned to the storage location set 635. In an embodiment where the storage medium 641 comprises a plurality of zones, the set of storage locations 631 can be located in odd-numbered zones of the plurality of zones, and the set of storage locations 635 can be located in even-numbered zones of the plurality of zones.

Optionally, the storage device controller 630 can be configured to use a storage location mapping scheme (e.g. 610) to associate the set of storage locations 631 with the actuator 643 and to associate the set of storage locations 635 with the actuator 653. For example, the mapping scheme 610 defines the storage location set 631 by associating the actuator 643 with a range of storage locations (SL 1-SL k) and defines the storage location set 635 by associating the actuator 653 with another range of storage locations (SL k+1-SL m). In at least some embodiments, a mapping scheme can be specified by a computing device connected to the storage device 600. For example, the storage device controller 630 can be configured to receive a storage location mapping scheme (e.g., 610) from a computing device connected to the storage device (such as a host computer, etc.). At least some of the principles and techniques discussed herein for defining logical address sets can also be applicable to the definition of storage locations sets.

Optionally, the storage device controller 630 can be configured to maintain separate command buffers for the separate actuators. For example, the storage device controller 630 can maintain a command buffer 671 for the actuator 643 and a separate command buffer 675 for the actuator 653. For example, the command buffer 671 can be used to process data access commands containing logical addresses that are associated with storage locations that are associated with the actuator 643. The command buffer 675 can be used to process data access commands containing logical addresses that are associated with storage locations that are associated with the actuator 653.

Figure 7:
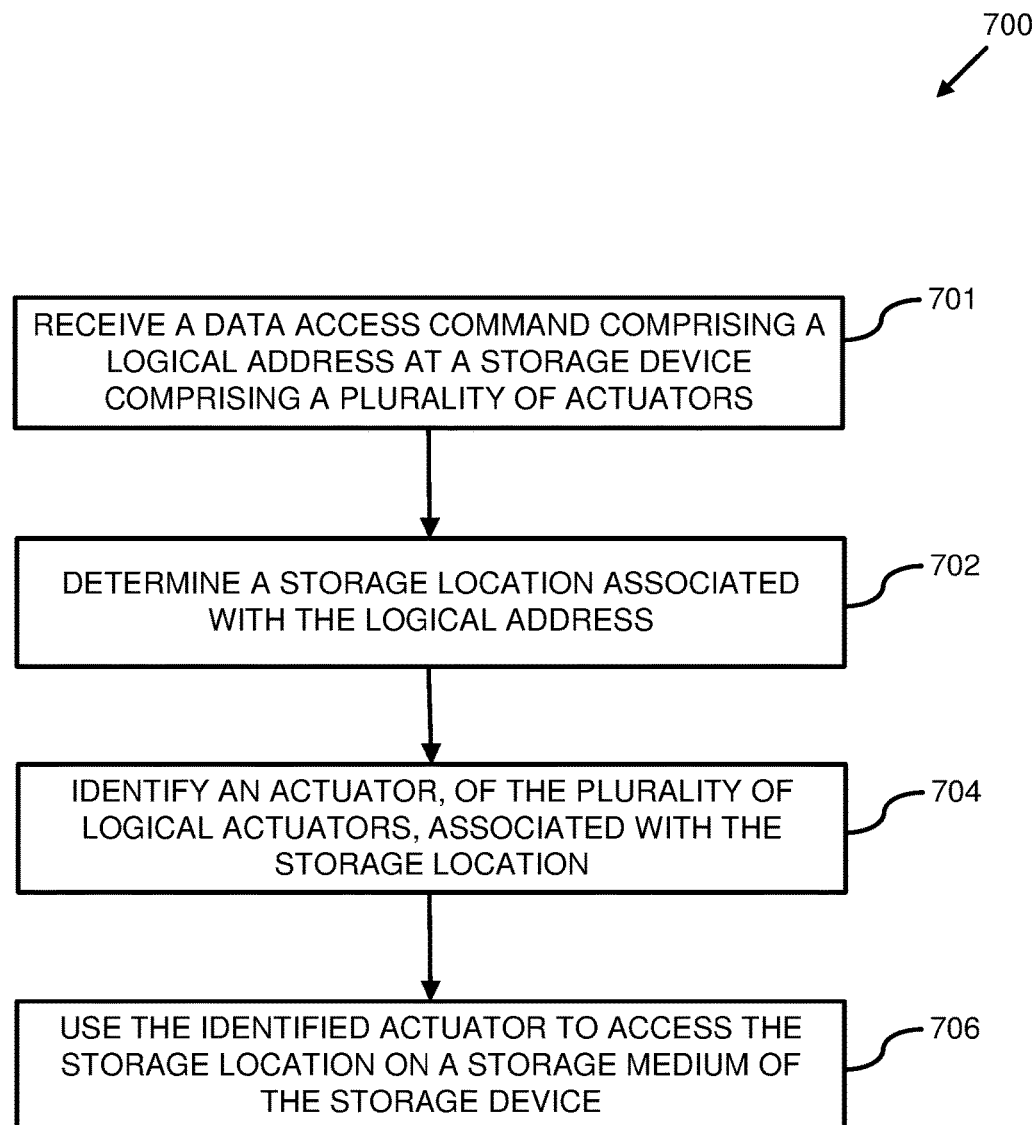
FIG. 7 is a flowchart of an example method for accessing a storage medium of a multi-actuator storage device using multiple actuators.

FIG. 7 is a flowchart of an example method 700 for accessing a storage medium of a multi-actuator storage device using multiple actuators. At least some of the example systems or devices described herein can be used to perform the example method 700. For example, the example storage device 600, depicted in FIG. 6, can be used to perform the example method 700.

At 701, a data access command comprising a logical address is received at a storage device comprising a storage medium and a plurality of actuators. The plurality of actuators can be used to access the storage medium of the storage device.

The data access command can be received from a computing device connected to the storage device via a communication channel. The communication channel can comprise one or more wired and/or wireless connections. In a particular embodiment, the data access command can be received from a host computer connected to the storage device via a serial connection (such as a SATA, etc.). The logical address can comprise an identifier that is associated with a storage location in a storage medium of the storage device (such as a logical block address (LBA)). The data access command can comprise a command to read data associated with the logical address and/or write data associated with the logical address.

At 702, a storage location on the storage medium associated with the logical address is determined. Example storage locations include data blocks, data sectors, circular tracks, zones, etc. In at least some embodiments, a storage location can be associated with an identifier (such as a physical address, a sector identifier, a tract identifier, a zone identifier, or the like). The storage device can be configured to maintain mappings of logical addresses to storage locations on the storage medium. A storage location of data associated with the logical address can be changed by moving the data to another storage location. However, by updating the mapping to associate the logical address with the new storage location, external devices (such as a connected host computer) can continue to use the logical address to access the data. In at least some embodiments, the data associated with the logical address can be moved from a storage location associated with one actuator to another storage location associated with another actuator. Such a move can be accomplished by reading the data using one actuator and writing the data to the other storage location using the other actuator.

At 704, an actuator, of the plurality of actuators, that is associated with the storage location is identified. In at least some embodiments, the storage device can be configured to associate sets of storage locations with the plurality of actuators of the storage device. For example, the storage device can associate a first set of storage locations on the storage medium of the storage device with a first actuator of the plurality of actuators and can associate a second set of storage locations on the storage medium with the second actuator of the plurality of actuators. In such an embodiment, identifying an actuator that is associated with the storage location associated with the logical address can comprise determining a storage location set that contains the given storage location and identifying an actuator associated with the storage location set.

In at least some embodiments, associating sets of storage locations with the plurality of actuators can comprise associating ranges of tracks of the storage medium with the actuators. For example, a first range of tracks of the storage medium can be associated with a first actuator of the storage device and a second range of tracks of the storage medium can be associated with a second actuator of the storage device. In such an embodiment, a range of tracks closer to an outer diameter of the storage medium can be associated with one actuator and another range of tracks closer to an inner diameter of the storage medium can be associated with the different actuator. Additionally or alternatively, associating a first set of storage locations with a first actuator and associating a second set of storage locations with a second actuator can comprise repeatedly alternating between associating a track of the storage medium with the first actuator and associating a subsequent track of the storage medium with the second actuator.

In at least some embodiments, a command can be received at the storage device, specifying one or more storage location sets. Responsive to receiving such a command, the specified one or more storage location sets can be associated with one or more actuators, of the plurality of actuators. For example, a command can be received that specifies a first set of storage locations. The set of storage locations can then be associated with a first actuator of the plurality of actuators subsequent to receiving the command. In at least some scenarios one or more additional storage locations sets can be specified in the command. The one or more additional storage locations sets can be associated with one or more additional actuators of the storage device. Additionally or alternatively, multiple commands can be received, specifying different storage location sets. In at least some such embodiments, the command can be received from a computing device (such as a host computer) connected to the storage device.

At 706, the identified actuator is used to access the storage location on the storage medium. Accessing the storage location can comprise reading one or more data items (such as data blocks or the like) from the storage location and/or writing one or more data items to the storage location using the identified actuator. The received data access command can indicate whether a write operation or a read operation is requested. In at least some embodiments, the storage device can use the plurality of actuators to simultaneously access different storage locations of the storage medium.

Figure 8:
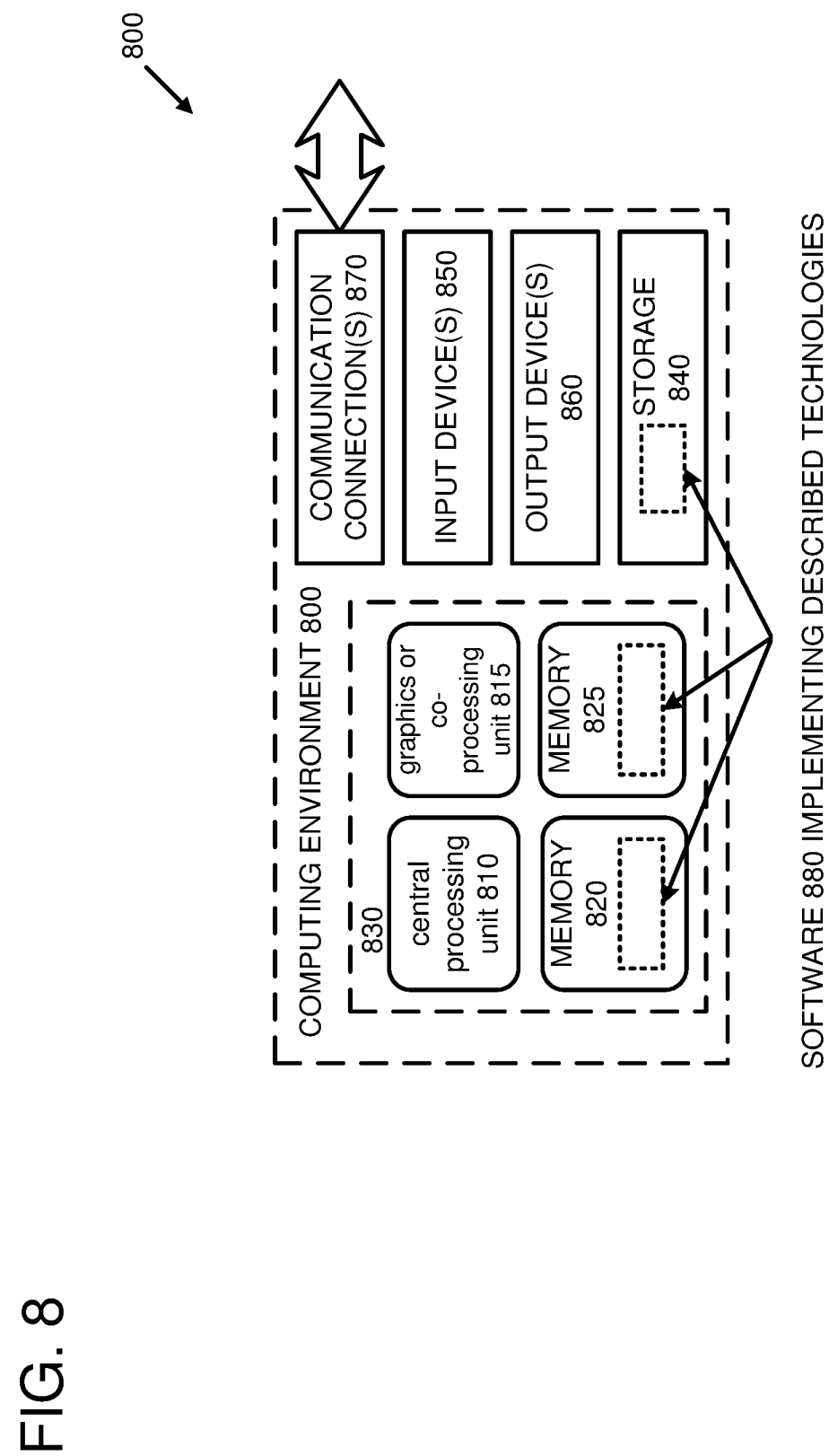
FIG. 8 is a diagram depicting a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 can store software 880 implementing one or more innovations described herein, (for example, in the form of computer-executable instructions suitable for execution by the processing unit(s)). In at least some embodiments, the computing environment 800 can comprise a computing device or host computer as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 can store instructions for the software 880 implementing one or more innovations described herein (for example in a storage medium and/or firmware of the storage 840). In at least some embodiments, the tangible storage 840 can comprise one or more storage devices as described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention.

What is claimed is:

1. A system for data access using a hard drive, the system comprising:
    a host computer connected to the hard drive, wherein the hard drive is connected to the host computer via an interface that supports more than one data storage protocol; and
    the hard drive, further comprising a storage medium, a first actuator configured to access the storage medium, a second actuator configured to access the storage medium, and a controller, wherein the controller is configured to:
    receive a storage location mapping scheme from the host computer, wherein the storage location mapping scheme associates a first set of storage locations on the storage medium with the first actuator and associates a second set of storage locations on the storage medium with the second actuator;
    use the storage location mapping scheme to assign the first set of storage locations on the storage medium to the first actuator and to assign the second set of storage locations on the storage medium to the second actuator;
    receive a data access request from the host computer via the interface, wherein the data access request comprises a logical address;
    determine that the logical address is associated with a storage location in the first set of storage locations; and
    use the first actuator to access a storage location in the first set of storage locations on the storage medium that is associated with the logical address.

2. The system of claim 1, wherein:
    the first set of storage locations comprises a range of tracks closer to an outer diameter of the storage medium than the second set of storage locations; and
    the second set of storage locations comprises a range of tracks closer to an inner diameter of the storage medium than the first set of storage locations.

3. The system of claim 1, wherein:
    the storage medium comprises a plurality of zones;
    the first set of storage locations are located in odd-numbered zones of the plurality of zones; and
    the second set of storage locations are located in even-numbered zones of the plurality of zones.

4. The system of claim 1, wherein the controller is further configured to:
    maintain a first command buffer associated with the first actuator; and
    maintain a second command buffer associated with the second actuator.

5. A method comprising:
    receiving a storage location mapping scheme at a storage device comprising a storage medium and a plurality of actuators, wherein the storage location mapping scheme is received from a computing device connected to the storage device, wherein the storage location mapping scheme associates a first set of storage locations on the storage medium with a first actuator of the plurality of actuators and associates a second set of storage locations on the storage medium with a second actuator of the plurality of actuators;
    assigning the first set of storage locations on the storage medium of the storage device to the first actuator of the plurality of actuators based on the storage location mapping scheme;
    assigning the second set of storage locations on the storage medium to the second actuator of the plurality of actuators based on the storage location mapping scheme;
    receiving a data access command, comprising a logical address, at the storage device, wherein the data access command is received via an interface that supports more than one data storage protocol;
    determining that the logical address is associated with a storage location on the storage medium that is in the first set of storage locations; and
    using the first actuator to access the storage location on the storage medium.

6. The method of claim 5, wherein:
    the assigning the first set of storage locations to the first actuator comprises assigning a first range of tracks of the storage medium to the first actuator; and
    the assigning the second set of storage locations to the second actuator comprises assigning a second range of tracks of the storage medium to the second actuator.

7. The method of claim 5, wherein the assigning the first set of storage locations to the first actuator and the assigning the second set of storage locations to the second actuator comprises repeatedly alternating between:
    assigning a track of the storage medium to the first actuator; and
    assigning a subsequent track of the storage medium to the second actuator.

8. The method of claim 5, further comprising receiving the data access command via a SATA interface.

9. A storage device comprising:
    a storage medium;
    a first actuator configured to access the storage medium;
    a second actuator configured to access the storage medium; and
    a storage device controller configured to:
    receive a storage location mapping scheme from a computing device connected to the storage device, wherein the storage location mapping scheme associates a first set of storage locations on the storage medium with the first actuator and associates a second set of storage locations on the storage medium with the second actuator, use the storage location mapping scheme to assign the first set of storage locations on the storage medium to the first actuator and to assign the second set of storage locations on the storage medium to the second actuator, receive a data access command comprising a logical identifier, wherein the data access commands is received via an interface that supports more than one data storage protocol, determine that the logical identifier is associated with a storage location in the first set of storage locations, and use the first actuator to access the storage location associated with the logical identifier on the storage medium.

10. The storage device of claim 9, wherein the storage device controller is further configured to:

receive a second data access command comprising a second logical identifier;

determine that the second logical identifier is associated with another storage location in the second set of storage locations; and use the second actuator to access the another storage location associated with the second logical identifier on the storage medium.

11. The storage device of claim 9, wherein:

the storage location mapping scheme associates a first range of tracks on the storage medium with the first actuator and associates a second range of tracks on the storage medium with the second actuator.

12. The storage device of claim 11, wherein:

the first range of tracks is closer to an outer diameter of the storage medium than the second range of tracks.

13. The storage device of claim 9, wherein the storage device controller is further configured to maintain a first command buffer for the first actuator and a second command buffer for the second actuator.

14. The storage device of claim 9, wherein the storage device controller is further configured to receive the data access command via the interface using at least one of SATA or SAS protocol.

* * * * *